United States Patent [19]
Hubert

[11] 3,721,231
[45] March 20, 1973

[54] CATHETER FOR HIGH PRESSURE INJECTIONS

[75] Inventor: Franz Hans Hubert, Carlstadt, N.J.

[73] Assignee: Becton, Dickinson and Company, East Rutherford, N.J.

[22] Filed: Feb. 1, 1971

[21] Appl. No.: 111,285

[52] U.S. Cl. .............................. 128/2.05 R, 128/348
[51] Int. Cl. ............................................. A61m 25/00
[58] Field of Search ...... 128/2 R, 2 M, 2.05 R, 214.4, 128/221, 348, 349 R, 350 R, 351

[56] References Cited

UNITED STATES PATENTS

| | | | |
|---|---|---|---|
| 2,531,667 | 11/1950 | Brent | 128/214.4 |
| 3,055,361 | 9/1962 | Ballard | 128/214.4 |
| 3,312,220 | 4/1967 | Eisenberg | 128/214.4 |
| 3,469,579 | 9/1969 | Hubert | 128/214.4 |
| 3,612,038 | 10/1971 | Halligan | 128/2.05 R |

FOREIGN PATENTS OR APPLICATIONS

| | | | |
|---|---|---|---|
| 463,704 | 10/1968 | Switzerland | 128/348 |
| 785,136 | 10/1957 | Great Britain | 128/349 R |

*Primary Examiner*—Dalton L. Truluck
*Attorney*—Kane, Dalsimer, Kane, Sullivan & Kurucz

[57] ABSTRACT

A medical catheter is formed from a hub within which an elongated flexible tube is disposed. The bore of the tubing within the hub is tapered to accept the tapered tip of a male connector. The tubing is coextensive with the shaft of the hub. A method for fabricating the medical catheter involves mounting the hub on a mandrel, which has a tapered portion, adapted to be positioned within the hub, and an elongated pilot extending from the tapered portion through the hub. Heat softenable catheter tubing is fed onto the tapered portion until resistance is met, then the tubing while heat softened, is forced over the tapered portion of the mandrel in the recess between the tapered portion and the hub. The tubing is solidified and the joined catheter removed from the mandrel.

8 Claims, 4 Drawing Figures

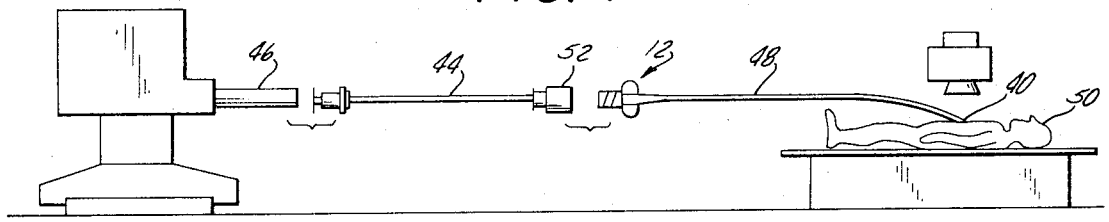
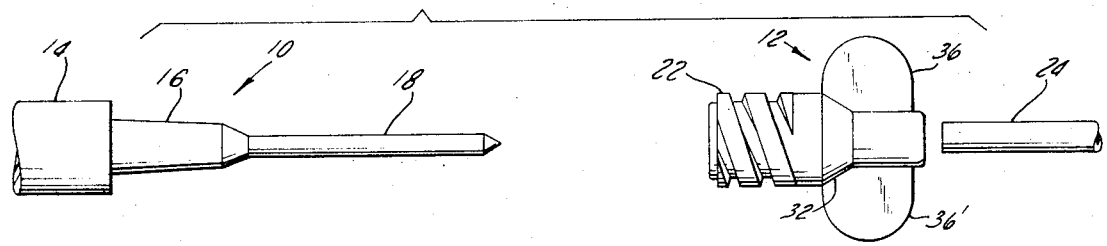
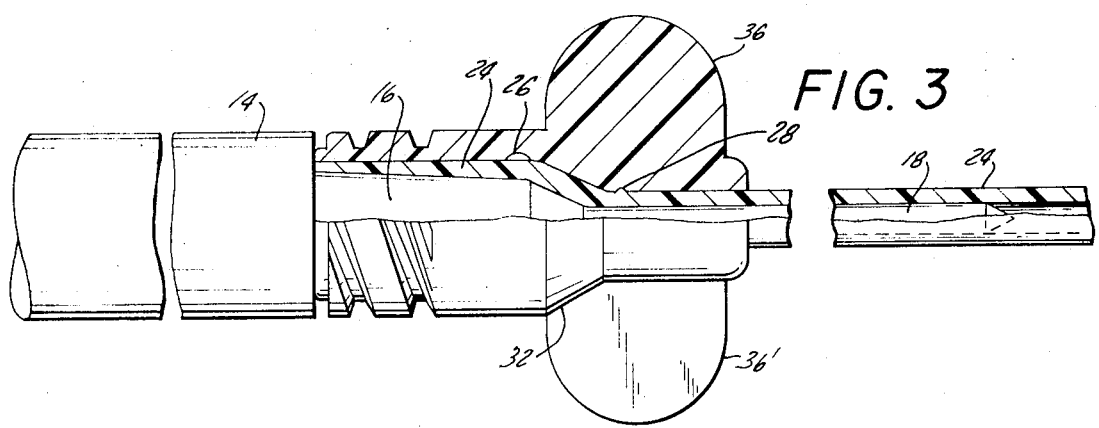
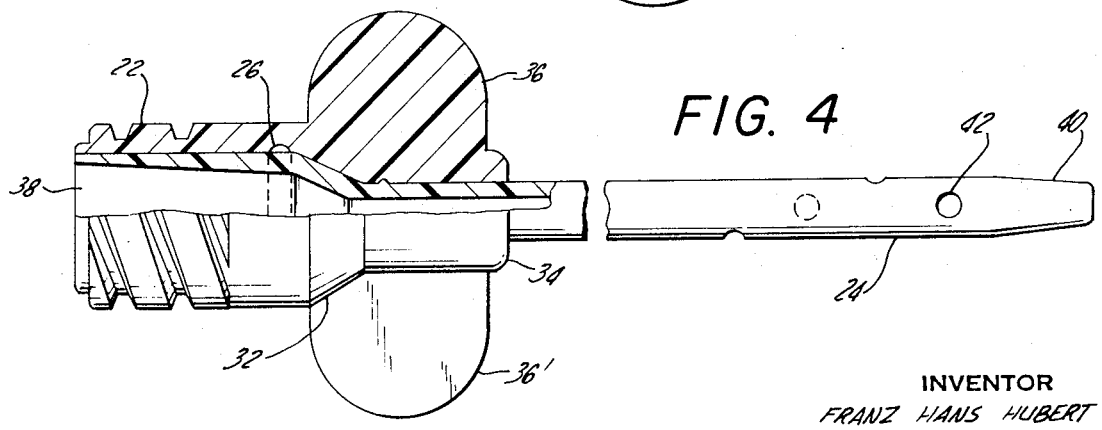

CATHETER FOR HIGH PRESSURE INJECTIONS

BACKGROUND OF THE INVENTION

The present invention is directed to a medical catheter particularly suitable for high pressure applications. In particular, it is directed to a new method of joining catheter tubing to a surrounding hub to obtain an optimal flow of fluid from a source interengaged with the hub and tubing, through the catheter tubing.

In the past flexible catheter tubing has been joined at one end to the neck of a connecting hub by the use of adhesives, heat-sealable tubing, fillets, ribbed adapters and the like. While for certain purposes, such conventional joint is satisfactory, nonetheless, for certain high pressure applications and specialized techniques, such joint is subject to several defects. Since the surface area of the bonding surfaces between the catheter tubing and hub is small compared to the total surface area of the hub, the joint tends to weaken under high pressure or turbulent flow. This weakening can result in axial movement of the tubing with respect to the hub, thereby further disrupting flow and/or rupture of the bond between the catheter and hub. This is effect is particularly pronounced during dye injection employing high pressure angiocardiography injection machines where an internal pressure in the order of 1,100 lbs. per square inch is developed within the hub and catheter.

For the above and other applications it is particularly desirable that the hub and catheter be adapted to receive dye or other fluids from a male connector capable of interengaging the hub and catheter. A highly satisfactory male connector for this purpose is the male LUER-LOK connector. Such a connector is characterized by an internally threaded sleeve portion adapted to interlock with a hub and a centrally projecting tapered tip adapted to form a frictional fit with a tapered central bore of a female hub.

The prior art has taught various methods for joining tubing, such as garden hoses, to coupling members. An example of such a method is disclosed in U.S. Pat. No. 2,686,337. Such methods are not readily adapted to medical catheters employed in combination with male connectors with tapered tips. To ensure a smooth transition between the fluid issuing from the male tapered tip and catheter tubing, it has now been found necessary to form catheter tubing with a tapered internal bore and joing the tubing coextensive with the inner shaft of a female hub. The prior art, including the above noted patent, has not provided a technique for achieving a solution to this problem.

SUMMARY OF THE INVENTION

It is a primary object of this invention to provide a method for joining flexible tubing with a rigid hub such that a pressure-resistant joint is formed.

It is another object of the invention to provide a preformed catheter useful for high pressure applications and adapted to mate with a male connector having a tapered tip to provided a smooth transition between fluid issuing from the tapered tip and the catheter tubing.

The above and other objects are met in a method for joining a flexible tubular catheter coextensively with the inner shaft of a female rigid hub, the catheter and hub being adapted to interlockingly engage the tapered tip and sleeve of a male connector. The hub is mounted on a mandrel having a tubular housing with a protruding tapered portion terminating in an elongated pilot, the pilot adapted to protrude through the hub. When the hub is mounted properly on the tapered portion, there is a tapered recess between the outer surface of the tapered portion and the inner shaft of the hub. Flexible, heat softenable catheter tubing is fed over the pilot and onto the tapered portion of the mandrel until resistance is met. While heat softened, the catheter tubing is forced over the tapered portion of the mandrel to completely fill the recess between the tapered portion and the hub. The tubing is solidified and the joined catheter and hub are removed from the mandrel.

The medical catheter formed by the above method is particularly adapted for high pressure applications, since the flexible tubing is coaxially mounted within the hub coextensive with the entire shaft of the hub. The thickness of the tubing within the hub gradually increases as one progresses from the mouth to the central portion of the tubing within the hub, thereby forming an internally tapered portion. This tapered portion of the tubing is particularly adapted to receive the tapered tip of a male connector. A slip-resistant smooth fit is thereby achieved.

BRIEF DESCRIPTION OF DRAWING

The invention will be more fully understood from the following detailed description of an illustrative embodiment shown by the accompanying drawing, in which:

FIG. 1 is a schematic view showing the apparatus of the invention partially emplanted in a patient in a roentgenography application;

FIG. 2 is an exploded fragmentary enlargement illustrating the method of forming the medical catheter on a mandrel;

FIG. 3 is a fragmentary sectional enlargement illustrating the relative positions of the mandrel and hub after formation of a medical catheter; and FIG. 4 is an enlarged, fragmentary view, partially in section illustrating the medical catheter of the invention.

DESCRIPTION OF PREFERRED EMBODIMENTS

FIGS. 2 and 3 illustrate the method for forming the catheter of the invention. A mandrel 10 is provided for engaging the hub 12 of the medical catheter. The mandrel includes a base portion 14, a tapered cylindrical anvil 16 and an elongated pilot 18.

The diameter of pilot 18 is slightly less than the internal diameter of flexible tubing 24, and offers substantially no resistance when tube 24 is slid over the pilot. The maximum diameter of tapered anvil 16 is less than the internal diameter of the shaft of hub 12 so as to provide a tapered recess when hub 12 is mounted thereover.

To form the medical catheter of the invention, hub 12 is placed over pilot 18 and anvil 16. Flexible, heat softenable catheter tubing 24 is next fed over pilot 18 and onto tapered anvil 16 until resistance is met.

In the preferred process where large quantities of assemblies are to be made, an internally heated mandrel is employed to melt tubing 24 and completely fill the recess between the anvil and the internal shaft of the hub. The heating cycle is started and the tubing is heated to its softening temperature. Pressure is applied to the tubing in the direction of base 14 and the softened tubing flows into the recess between the anvil and hub, filling the entire space. The heating cycle is terminated, and the joint quickly cools so that the catheter tubing is firmly emplanted within the hub.

In order to provide a firmer joint between the tubing 24 and hub 12, recess 26 is provided in the form of an annular channel about the inner periphery of the shaft of the hub. During formation of the medical catheter, the heat softened tubing material flows into hub recess 26. Upon solidification therein, the tubing resists axial movement within the shaft of the hub. If desired, additional recesses 28 may be provided in the hub for this purpose.

Turning now to FIG. 4, a medical catheter of the invention is illustrated. The catheter comprises a hub 12 having a partially tapered shaft therethrough and a flexible catheter 24 joined to the shaft of the hub and coextensive with the shaft. The hub is formed from a rigid material, such as a thermoplastic or thermosetting resin. A preferred material is polypropylene. The hub may be vacuum formed employing a suitable shaped die. The hub is generally cylindrical in shape.

The hub has an externally threaded cylindrical shell portion 22 adapted to interengage the surrounding sleeve of a male connector, particularly a male LUER-LOK connector having a centrally protruding tapered hollow tip (not shown). A tapered portion 32 of the hub extends from the cylindrical shell portion 22 to an integral neck portion 34 of the hub. In order to facilitate gripping the hub a pair of opposed protruding wings 36, 36' are integrally associated with the hub and extend from the terminal end of the neck portion of the hub to the joining point between the threaded outer shell and the tapered portion of the hub.

The internal diameter of the hub shaft concentrically spaced within hub shell 22 and extending therethrough is greater than the tapered tip of the male luer connector employed in combination with the hub for roentgenography purposes or the like. The hub shaft in the neck portion is of slightly greater diameter than the outer diameter of the flexible catheter tubing inserted therein such that a slip fit is formed. The shaft of the hub is tapered between the neck portion and the shell portion.

The catheter tubing associated with the hub has a first portion coextensive with the shaft of the hub. From the mouth of the threaded shell portion of the hub, the tubing is of progressively greater thickness such that a luer slip is formed which is adapted to receive the male tapered tip of a LUER-LOK connector. The thickness of the catheter tubing is greatest within the tapered portion of the hub.

At least one recessed annular channel is provided within the shaft of the hub, the tubing completely filling the recessed portions. By this innovation the tubing is safeguarded against undesirable axial movement within the shaft of the hub.

The elongated hollow catheter tubing 24 terminates at one end at the mouth 38 of the hub, and at the other end in blunt taper 40. As illustrated in FIG. 4, adjacent the blunt end of the tubing there are spaced a series of outlet ports 42 for receiving or discharging liquids. The arrangement and size of the outlet ports is determined, in part, upon the specific environment in which the catheter is employed. The various possible arrangements of ports are well known to the art.

The flexible, hollow catheter tubing is formed, preferably, from heat-softenable materials, such as thermoplastic and thermosetting resins. A particularly preferred material is pressure resistant polyethylene tubing.

Turning now to FIG. 1, it is seen that the medical catheter of the invention may be employed for roentgenography applications among others. For this purpose it is desirable that the tubing be formed from radiopaque materials, such as a leaded polyethylene. Such tubing is generally from about 0.04 – 0.05 inch in thickness.

In use, the blunt tapered end 40 of the catheter is introduced into a suitable vessel in the body by conventional techniques. The male connecting end 52 of a suitable adapter 44 is securely engaged to the medical catheter 48. A particularly preferred adapter is the well-known flexible LUER-LOK connecting set available from Becton, Dickinson and Co. A conventional die injection device 46 is employed to inject die into the adapter, through the medical catheter 48, and into the body 50.

The invention is not to be limited except as set forth in the following claims:

I claim:

1. A catheter for high pressure applications adapted for connection to a source of fluid comprising:
   a rigid hub of a first plastic material having a passageway therethrough;
   said hub having means on the exterior surface thereof to facilitate its connection to a fluid source;
   an elongated flexible tube of a second plastic material with a passageway therethrough having an end adapted for insertion into the body and said tube including means therein to facilitate connection to a fluid source; and
   said flexible tube having the other end thereof extending substantially through said hub passageway and being connected to the hub on a substantial portion of the inner surface of the hub by being deformable under pressure and heat below the deformation temperature of the first plastic material to permit the positioning of one end portion thereof into a substantially coaxial concentric location in the hub with the outer wall of said one end portion in rigid interengagement with the adjacent inner wall of the hub thereby preventing axial movement of said one end portion with respect to said hub during use of the catheter.

2. The invention in accordance with claim 1 wherein the first plastic material is polypropylene and the second plastic material is polyethylene.

3. The invention in accordance with claim 1 wherein the means on the exterior surface of the hub to facilitate its connection to a fluid source includes a threaded end portion for interengagement with a threaded corresponding surface on the fluid source, and the means in the tube to facilitate connection to the fluid source includes a tapered inner surface for frictional interengagement with corresponding surfaces on the fluid source.

4. The invention in accordance with claim 3 wherein the hub has a tapered portion extended axially from said threaded outer surface portion and a cylindrical neck portion extending axially from the tapered portion.

5. The invention in accordance with claim 1 wherein the end of said tube distal from said hub terminates in a blunt tapered tip adapted to be introduced into a body vessel, and a plurality of ports communicating with the passageway through the tube and being spaced adjacent said tip of the tube.

6. The invention in accordance with claim 1 wherein the hub has at least one annular channel recess on the inner surface of the hub and positioned so that the tube when deformed under pressure and heat enters said channel and solidifies therein.

7. The invention in accordance with claim 1 wherein a pair of opposed wings extend outwardly from said hub to form a gripping surface for manipulating the catheter.

8. The invention in accordance with claim 1 wherein the one end portion of said tube positioned within said hub has a central portion of greater thickness than the two distal end parts of the one end portion of the tube.

* * * * *